Patented Sept. 22, 1931

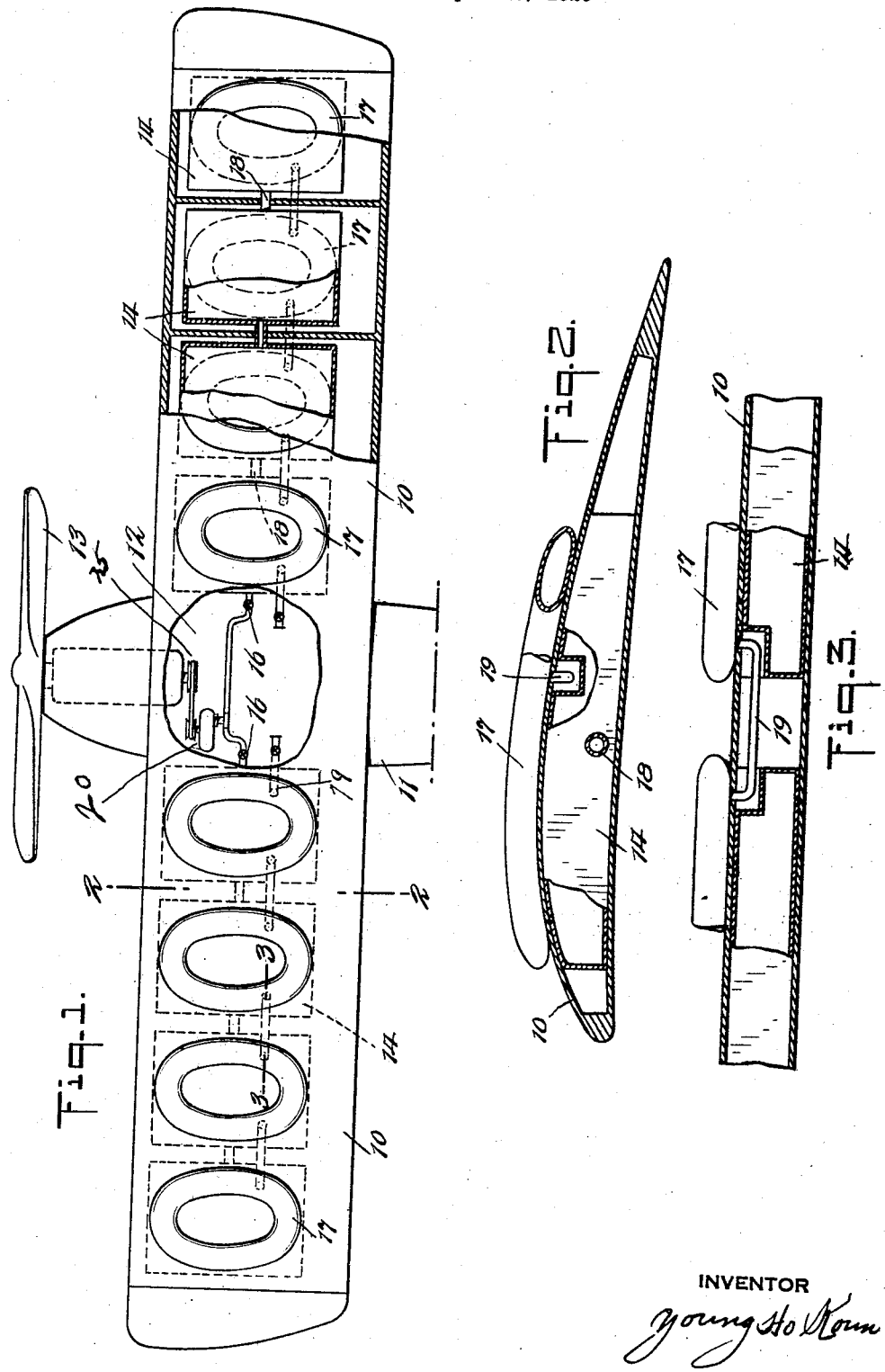

1,824,280

UNITED STATES PATENT OFFICE

YOUNG HO KOUN, OF NEW YORK, N. Y.

AIRCRAFT

Application filed September 13, 1929. Serial No. 392,286.

The main object of this invention is to provide an aircraft with vacuum or partial-vacuum tanks, for the purpose of assisting in the building of strong construction of wings of aeroplanes, and to aid in the support of the sustaining surface.

Another object of this invention is to provide means to pump air from within the wing that is specially constructed as hollow and air tight compartments, thereby causing a vacuum or partial-vacuum in the wings and thereby lightening the wings.

Another object of this invention is to provide an aircraft which combines features of heavier-than-air machines and lighter-than-air machine; and is provided with inflatable gas bags mounted on the wing.

Mounted upon the tanks are streamline inflated gas bags, and the difference between the atmospheric pressure on the gas bags on the upper surface of the wings and the air pressure on the lower surface of the wings becomes great and the lifting power of the wings is increased accordingly.

The tanks are in general shaped shallow and flat, and are made with light but strong material, as some of the modern alloy metals, such as "aerial-metal". These are built into the wings of the plane, and arranged to make an air-tight compartment or compartments. Valves are provided on the edge of the wings, near to the fuselage, and conduits are connected between the valve and the tanks and tube connected between valve and pumps. Connection to the valve from the main power plant of the plane are provided for pumping and providing vacuum. In the conduits is a valve, or valves, by means of which air may be introduced into the air-tight compartments as occasion may require.

Referring to the drawings, Figure 1 is a top-plan view of the aeroplane showing the vacuum tanks and the gas bags mounted in place on the wings thereof.

Figure 2 is a cross-sectional view taken on line 2—2 of Figure 1.

Figure 3 is a cross-sectional view taken on line 3—3 of the Figure 1.

Referring in detail to the drawings, number 10 indicates the wing of a monotype aeroplane, the changes required in any other type being of a minor structural detail. The fuselage—11 having a cockpit—12 suspended therefrom. Power for propulsion is attained from a power plant located in the fuselage which drives propeller—13. The wings are built with a plurality of tanks—14 which are arranged side by side, as sectional compartments, and which are communicating through means of a conduit—18, to which is connected a valve—16. Bags—17 are mounted on each of the tanks and are adapted to receive gases from the gas tank through means of the connecting tube—19. The gas tanks are not shown in the drawings.

The rear end of the motor has the crankshaft protruding, on which shafting is a pulley. This pulley is connected with a pump-compressor. A tube is attached from the pump—20, connected to valve—16, and therefrom to connected conduit—18.

The aeroplane described herein is adapted to be flown into the air with the bags inflated. The wings are constructed with the tanks in combination so that the upper surface of the wings and the lower surface of the wings are to form the upper and lower surfaces of the tanks. The gas bags are made into a pure stream-line shape in order to minimize wind-resistance as much as possible.

The gas bags are mounted on the wings in such a way that air cannot get in between them and the wings.

The bags are made of double linings, the outer bag being made with strong material so it can stand against the bad weathers and deterioration. The gas used in the outer bag is some non-inflammable gas.

It is understood that at the present time my invention is a good improvement on an aeroplane wing or wings. Applying partial vacuum or vacuum principle on or in aeroplane wings is very useful. Applyng in a balloon or anywhere about the airship, vacuum is rather doubtful in practicability on account of the difficulties of construction and balancing.

The only way to adapt the vacuum principles and uses to an airplane is the use of the partial-vacuum or vacuum on or about or in the wings.

Having now particularly described and ascertained the nature of my said invention, and the manner in which the same is to be performed, I declare that that which I claim is:

1. In an aircraft, partial vacuum or vacuum tanks built into said wings, combinations of tanks and wings to form hollow space in the said wings, and stream-line gas bags mounted on said tanks.

2. In an aircraft, partial vacuum or vacuum tanks built into said wings, combination of tanks and wings to form hollow space in the said wings, and stream-line gas bags mounted on the said tanks, valves mounted on the edge of said wings, conduits connected between said tanks and valves, tube connected to said valve, pump connected to the said tubes.

3. In an aircraft partial-vacuum or vacuum provided in the wings thereof, combinations of wings and tanks to form hollow space in the said wings, means to have air-tight compartments, streamline gas bags mounted on said tanks, valves mounted on the edge of said wings, conduits connected between said tanks and valves, tubes connected to said valves, pumps connected to said tubes to pump air out from the said tanks.

In witness whereof I affix my signature.

YOUNG HO KOUN.